C. B. BAKER & E. GIFFORD.
BRICK PRESS.
No. 3,731. Patented Sept. 7, 1844.
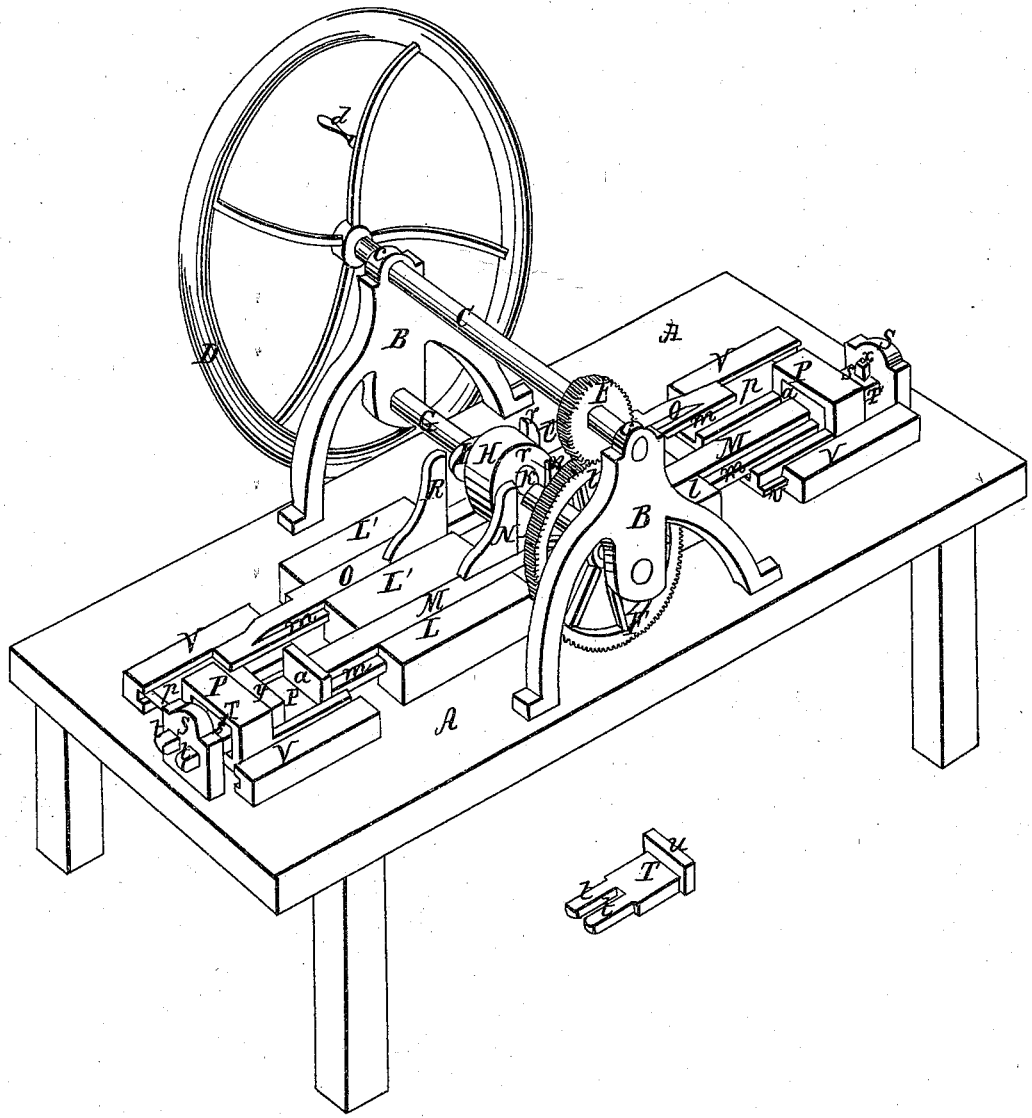

UNITED STATES PATENT OFFICE.

C. B. BAKER AND E. GIFFORD, OF TROY, NEW YORK.

BRICK-PRESS.

Specification of Letters Patent No. 3,731, dated September 7, 1844.

*To all whom it may concern:*

Be it known that we, COLLINS B. BAKER and EBENEZER GIFFORD, of the city of Troy, in the county of Rensselaer and State of New York, have made certain new and useful Improvements in Machines for Pressing Brick; and we do hereby declare that the following is a full and exact description thereof.

Our machine is double acting, that is to say, it is furnished with two molds, and two pistons, or followers, so arranged as to operate successively at each end of the machine, the bed of which is placed horizontally. There are two slides, moving in suitable guide pieces, one of which has a piston, and the other a mold, at each of its ends. These slides are moved back and forth by cams placed upon a horizontal shaft which crosses the bed of the machine at its middle, and is made to revolve by any adequate power.

In the accompanying drawing A, A, is the bed of the machine, which, in the one used by us is of plank, and is eight feet long, twenty inches wide, and six inches thick; the other parts we have made principally of cast iron.

B, B, are two standards, in which are the bearings of the horizontal shafts C and G. When moved by hand the shaft C, may be driven by means of the winch d, represented as attached to one of the arms of a fly wheel D. The shaft C, is represented as carrying a pinion E, which gears into the toothed wheel F, on the main shaft G. In the actual machine the pinion E, is about five inches, and the wheel F, about thirty two inches, in diameter. H, is a hub, or circular block of cast iron, keyed firmly on the shaft G. On the ends of this hub, and cast with it, are the cams I and K, the use of the hub being merely to sustain these cams.

M, M, is the follower, or piston, slide; a, a, being a piston on each of its ends; this slide has tongues m, m, on its sides, which fit into corresponding grooves on the stationary guide pieces L, L', l. From this slide rises the two standards N, n, which are cast solidly with it. These have their inner edges vertical, and stand about six inches apart, the cam K, being so adapted to them as to carry the slide back and forth to the proper distance. O, O, is a slide similarly acted upon with the slide M, M, and which carried at each end a mold P, P; the slide O, O, is widened at each end so as to bring the molds P, P, opposite to the followers; each mold has its under side, or bottom plate, P' extended out, to receive the brick to be pressed, one of which is shown at y.

V, V, L', l', are the guide pieces of the slide o, o; this slide has also two standards R, r, for the cam T, to operate against; these standards we have placed about ten inches apart, as the molds are to traverse to a greater distance than the pistons; the cam T, is, of course so formed and arranged as to give to the mold slide its proper motion.

S, S, are stancheons fixed firmly to the bed A A; these receive the tenons t, t, of a piece T, which has on its end a plate u, seen most distinctly in Fig. 2; this plate being of the same size with the follower a, and sustaining its pressure. By means of keys, or wedges, the piece T, and the plate u, may be adjusted so as to regulate the pressure; a wedge, or key, for this purpose is shown at x. This part of the apparatus we have constructed in this way, but other means may be adopted for effecting the same purpose.

From the foregoing description the operation of this machine will be readily understood; the molded bricks, when ready to be pressed, are to be placed by hand upon the under plate P' of the mold, and are, after pressure, to be in like manner, removed by hand, and another substituted therefor. By an adequate increase of power, any desired number of slides may be actuated on the same principle.

What we claim as new in the above described machine for pressing brick, is—

The manner in which we have arranged the molds and pistons, or followers; the molds and followers being affixed on either end of a slide, and said slides being moved back and forth, and the bricks pressed against a stationary plate or head in the manner described, the whole arrangement being substantially such as is herein set forth.

COLLINS B. BAKER.
E. GIFFORD.

Witnesses:
ARCHIBALD BULL,
P. L. JONES.